Feb. 6, 1951 O. H. SCHADE 2,540,692

WAVE GENERATING SYSTEM

Filed Oct. 16, 1946

INVENTOR
Otto H. Schade
BY H. S. Grover,
ATTORNEY

Patented Feb. 6, 1951 2,540,692

UNITED STATES PATENT OFFICE 2,540,692

WAVE GENERATING SYSTEM

Otto H. Schade, West Caldwell, N. J., assignor to Radio Corporation of America, a corporation of Delaware Application October 16, 1946, Serial No. 703,519

6 Claims. (Cl. 250—36)

The present invention relates to means for producing current variations of substantially sawtooth waveform.

Certain circuit arrangements heretofore used require a current flow therethrough where this flow varies in a substantially linear manner with respect to time for a portion of each cycle. This is true, for example, in television systems of the type in which current flowing in a pair of coils produces an electro-magnetic field which in turn is effective to bring about a deflection of the electron scanning beam of a cathode ray tube. If the current flow through these deflection coils is not linear, distortion of the reproduced image may result, the amount of this distortion in most cases being substantially directly proportional to the degree of current non-linearity.

Since it is customary to couple the current generating device (usually a power output tube) to the cathode ray beam deflection coils through a transformer, the effect on current linearity of the inductive reactance of the transformer must be taken into consideration. This is usually provided for by applying a voltage variation of particular waveform to the control electrode of the power output tube, this voltage variation being of such configuration as to compensate for the non-linearity of deflection which would otherwise be caused by the resistance of the deflection coils.

In accordance with the present invention, which has been illustrated in connection with a television scanning system but which may be used wherever a current of sawtooth waveform is desired, a circuit employing a single power output tube is provided which combines controllable current linearity with efficient operation. This power output tube includes a sufficient number of electrodes so that electrons collected by two of these electrodes during operation of the system are caused to flow in opposite directions through the split primary winding of a coupling transformer. These currents are of opposite phase, and produce an additive effect in the secondary winding of the transformer to thereby result in a substantially linear summation current flow through the cathode ray beam deflection coils. Furthermore, by means of a separate isolating electrode in the power output tube, the relative strength of the two currents flowing in the split primary winding of the coupling transformer is made substantially independent of the tube anode voltage, thereby obtaining that particular current relationship which is necessary for linearity of scan.

One object of the present invention, therefore, is to provide a single tube sawtooth current generator characterized by efficient operation and controllability of output.

Another object of the present invention is to provide a sawtooth current generator including a single multi-grid electron discharge tube, and means whereby the relationship between the flow of anode-cathode current, on one hand, and the flow of current between a particular grid and the cathode, on the other hand, may be made substantially independent of the tube anode potential within the normal operating range.

Other objects and advantages will be apparent from the following particular description of a preferred form of the invention and from the drawing, in which.

Figures 1, 2, 3, 4:
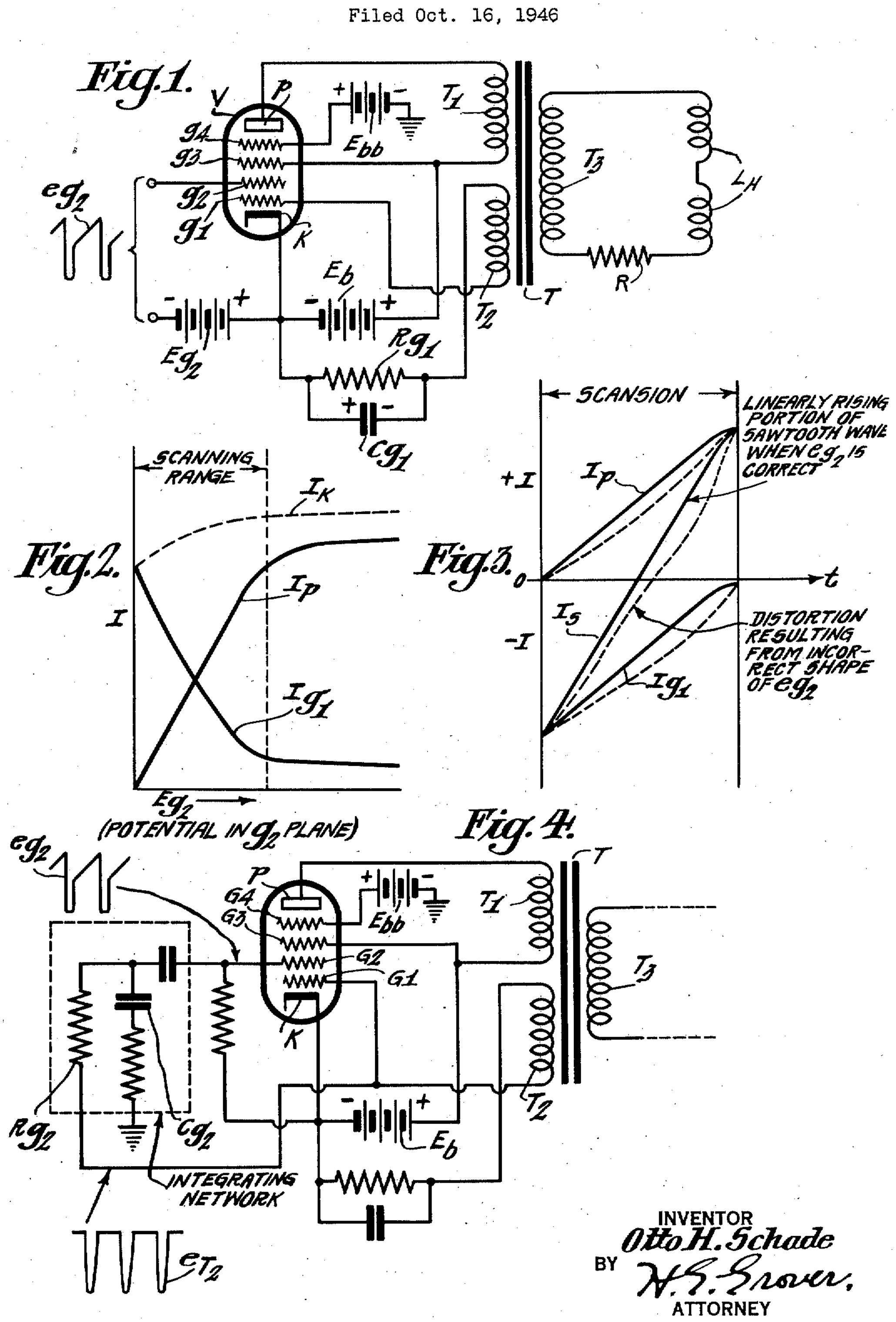
Fig. 1 is a circuit diagram of a preferred embodiment of the present invention.
Figs. 2 and 3 are graphs illustrating certain features of the operation of the circuit of Fig. 1.
Fig. 4 is a modification of the circuit of Fig. 1.

Referring now to the drawing and to Fig. 1 in particular, there is shown a power output tube V which is adapted to deliver cyclically varying current through a coupling transformer T to an inductive load member $L_H$ having a resistance R. This load member $L_H$ may, for example, comprise a pair of horizontal, or line, deflection coils forming part of a yoke assembly encircling the neck of a cathode ray tube in a television system.

Tube V is provided with an anode *p*, a cathode *k*, and a plurality of grids, or electrodes, $g_1$, $g_2$, $g_3$ and $g_4$. The anode *p* of tube V is connected through one winding $T_1$ of transformer T to the positive terminal of a source of potential $E_b$, the negative terminal of this potential source $E_b$ being connected, as illustrated, to the cathode *k*. The grid $g_3$ has the function of a screen grid and is connected also to the positive terminal of the source $E_b$ or to some fraction thereof.

Grid $g_1$ of tube V is connected through a further winding $T_2$ of transformer T to one end of a resistance load $R_{g_1}$ by-passed by a condenser $C_{g_1}$, the other end of this resistance-condenser combination being connected both to the cathode *k* of tube V and to the negative terminal of potential source $E_b$.

A further grid $g_4$ (serving as a suppressor grid) of tube V is provided with a relatively low steady positive D.-C. potential from a source $E_{bb}$. Grid $g_4$ may comprise the beam forming plates in a beam power tube. A third winding $T_3$ of transformer T is connected to supply energy to the inductive load member $L_H$. A still further source of potential $E_{g_2}$ is connected with the polarity shown between the cathode $k$ and grid $g_2$ (the latter having the function of a negative control grid) of tube V in series with a source of input voltage variations $e_{g_2}$. Potential source $E_{g_2}$ serves to maintain a negative bias on the control grid $g_2$ of tube V at all times, the input voltage variations $e_{g_2}$ serving in effect to vary the value of this negative bias.

In operation, it will be appreciated that the cathode current $I_k$ of tube V is the sum of its anode-cathode current $I_p$ and its grid $g_1$-cathode current $I_{g_1}$ when $g_1$ is positive. The relative distribution of these currents is controlled by the effective space potential in the plane of grid $g_1$. If $g_1$ is positive but effectively above space potential due to a high value of negative bias on the control grid $g_2$ neutralizing the positive field from $g_3$, then $g_1$ will collect all of the electrons emitted by the cathode $k$. When the effective space potential in the plane of grid $g_1$ is raised (by reason of a less negative bias on the control grid $g_2$ which permits the field of the positive screen grid $g_3$ to penetrate through $g_2$ and increase the space potential in the plane of $g_1$), then a certain percentage of the electrons emitted by cathode $k$ will continue on through the control grid $g_2$, screen grid $g_3$, and suppressor grid $g_4$ to the anode $p$. Hence, fewer electrons will be collected by grid $g_1$, and the grid current $I_{g_1}$ will decrease while the anode $I_p$ increases. These two currents therefore vary as a function of the waveform of the input voltage variation $e_{g_2}$, and their sum always equals the cathode current $I_k$, as shown by the graph of Fig. 2.

The current $I_p$ flows through winding $T_1$ of transformer T, while the current $I_{g_1}$ flows through the winding $T_2$. As shown in Fig. 2, these currents are of opposite phase, that is, $I_p$ is rising while $I_{g_1}$ is falling (over the effective scanning range or useful portion of each sawtooth current cycle).

However, by reversing the winding $T_2$ so as to alter its polarity, the electromagnetic field produced by the current flow $I_{g_1}$ may be made to combine with the electromagnetic field produced by the current flow $I_p$ in winding $T_1$ during scansion to induce in the winding $T_3$ a linear summation current $I_s$ (Fig 3) representing the current which actually flows in the load member $L_H$. As previously brought out, the distribution of the cathode current $I_k$ between the element $g_1$ and $p$ is controllable (and hence the linearity of the summation current $I_s$) independent of plate voltage by varying the waveform of the control voltage $e_{g_2}$. An incorrect shape of this input voltage $e_{g_2}$ may result in non-linearity of the current $I_s$, as shown, for example, by the broken lines in Fig. 3.

When the summation current $I_s$ flowing in transformer T varies in a linear manner with respect to time, the induced voltage $$L\frac{di}{dt}$$

across the transformer is constant. Transformer T is so connected that this voltage $$L\frac{di}{dt}$$

is of positive polarity with respect to the grid $g_1$ of tube V. The value of the actual positive potential on grid $g_1$ is adjustable by varying the bypassed resistance load $R_{g_1}$. The voltage appearing on condenser $C_{g_1}$ thus in effect acts as a bucking battery which is charged by the average current $I_g$ (avg.) and the excess voltage induced in transformer winding $T_2$. The D.-C. power dissipated in $R_{g_1}$ can also be used, if desired, in other loads having the same resistance as $R_{g_1}$.

Considering now the anode-cathode circuit of tube V, it will be seen that the voltage of source $E_b$ is substantially equal in value to the sum of the voltage ($E_L$) induced in the transformer winding $T_1$, the $I_pR$ drop in this winding $T_1$, and the plate voltage loss of tube V($E_p$). This may be expressed as $$E_b=E_L+I_pR+E_p$$

or $$E_p=E_b-E_L-I_pR$$

With a rising plate current $I_p$, the $I_pR$ drop in winding $T_1$ increases. Since the value of the potential source $E_b$ is fixed, and since the voltage $E_L$ across winding $T_1$ remains constant for a linear current $I_s$, it follows that the plate voltage $E_p$ of tube V will decrease in value during this plate current rise. This cyclic decrease in the plate voltage $E_p$ of tube V does not permit the current distribution $I_p-I_{g_1}$ as shown in Fig. 2 when using a triode as a power tube. It can be overcome only by producing a corresponding cyclic rise in the value of potential source $E_b$, but this condition does not produce linearity as the voltage $E_L$ must necessarily increase more than IR drop, indicating a non-linear rise of current $I_g$.

By means of the present invention, however, the cyclic decrease in the value of plate voltage $E_p$ is prevented from affecting the current distribution in tube V. This is accomplished by making such current distribution substantially independent of plate voltage $E_p$ through the use of the screen grid $g_3$ in tube V which acts to effectively isolate the plate voltage field from the field of the current-carrying grid $g_1$. The grid $g_3$, aided by the suppressor grid $g_4$, effectively shields the plate voltage field of tube V from the field of the current-carrying grid $g_1$, so that changes in the voltage of anode $p$ during operation of the system have no appreciable result on the current distribution between anode $p$ and grid $g_1$, which current distribution, according to a previously described feature of this invention, is determined by the negative control voltage on grid $g_2$. Hence, circuit operation in accordance with the curves of Fig. 2 is maintained by this independent control voltage $e_{g_2}$, together with linearity of current flow through the load member $L_H$.

Fig. 4 is a modification of the circuit of Fig. 1, showing one possible manner in which the latter circuit may act as a self-oscillating sawtooth current generator. In Fig. 4, a portion of the pulse voltage $e_{T_2}$ across transformer winding $T_2$ is passed through an integrating network including a series resistor $R_{g_2}$ and a shunt condenser $C_{g_2}$. This integrating network alters the shape of the pulses $e_{T_2}$ so that the voltage appearing on the grid $g_2$ of tube V is substantially identical to the control voltage waveform $e_{g_2}$ in the circuit of Fig. 1.

It will be understood that, if desired, other wave-shaping networks may be substituted for the particular integrating network illustrated in Fig. 4.

In the event that the tube V of Figs. 1 and 4 is of the beam-power type, the beam-forming plates may be employed to suppress the emission of secondary electrons from the anode at low anode voltages.

I claim:

1. A sawtooth wave current generator comprising: an electron discharge device having at least a cathode, an inner grid, a control grid, a screen grid, a suppressor grid and an anode; a first source of potential; a transformer having a secondary winding and a split primary winding; means connecting the positive terminal of said first potential source to said screen grid and also to said anode through a portion of the split primary winding of said transformer, means for applying a D.-C. potential to said suppressor grid, the negative terminal of said first potential source being connected to said cathode; a parallel resistance-condenser combination; means connecting one terminal of said resistance-condenser combination to said cathode; a load circuit connected to said secondary winding; a source of negative control voltage variations; means for applying said negative control voltage variations to said control grid; and means connecting the remaining terminal of said resistance-condenser combination to said inner grid through a further portion of said split primary winding, so that the two currents respectively flowing through the two said portions of said split primary winding during a part of each operating cycle will be substantially opposite in phase.

2. A sawtooth wave current generator in accordance with claim 1, in which said electron discharge device is additionally provided with a second source of potential having its positive terminal connected to said suppressor grid.

3. In a sawtooth wave current generator: an electron discharge device including a cathode, an inner grid, a control electrode, a screen grid, a suppressor grid, and an anode; a source of operating potential connected to said screen grid, a source of positive D.-C. potential connected to said suppressor grid; an inductive member; means connecting said anode to said cathode through said potential source and a portion of said inductive member; a parallel resistance-condenser combination, means connecting said inner grid to said cathode through said parallel resistance-condenser combination and a further portion of said inductive member; a source of negative voltage variations; and means for applying said negative voltage variations to said control electrode, whereby the resultant current flow in the anode-cathode circuit of said electron discharge device will bear a predetermined relationship both in amplitude and phase to the current flow in the grid-cathode circuit of said electron discharge device.

4. In a sawtooth wave current generator according to claim 3, further comprising an energy-storage network connected in the control grid-cathode circuit of said electron discharge device in series with the said further portion of said inductive member.

5. A sawtooth wave current generator comprising: an electron discharge device having at least a cathode, an inner grid, a control grid, a screen grid, a suppressor grid and an anode; a first source of potential; a transformer having a secondary winding and a split primary winding; means connecting the positive terminal of said first potential source to said screen grid and also to said anode through a portion of the split primary winding of said transformer, the negative terminal of said potential source being connected to said cathode; an energy-storage network; means connecting one terminal of said energy-storage network to said cathode; a load circuit connected to said secondary winding; means joining the remaining terminal of said energy-storage network to said inner grid through a further portion of the said split primary winding, so that the two currents respectively flowing through the two said portions of said split primary winding during a part of each operating cycle will be substantially opposite in phase; an integrating network; and means connecting said control grid to the said further portion of said split primary winding through said integrating network.

6. A sawtooth wave current generator in accordance with claim 5, in which said energy-storage network comprises a parallel resistance-condenser combination.

OTTO H. SCHADE.

REFERENCES CITED

The following references are of record in the file of this patent:

UNITED STATES PATENTS

| Number | Name | Date |
|---|---|---|
| 1,756,893 | Warner | Apr. 29, 1930 |
| 1,838,201 | Traver | Dec. 29, 1931 |
| 1,997,665 | Wheeler | Apr. 16, 1935 |
| 2,139,366 | Harold | Dec. 6, 1938 |
| 2,292,835 | Hepp | Aug. 11, 1942 |
| 2,360,697 | Lyman | Oct. 17, 1944 |